United States Patent
Häntsch et al.

(10) Patent No.: US 8,336,966 B2
(45) Date of Patent: Dec. 25, 2012

(54) SUPPORT PIN COMPONENT AND VEHICLE SEAT HAVING A SUPPORT PIN COMPONENT

(75) Inventors: Andreas Häntsch, Hannover (DE); Heiner Kempf, Hannover (DE)

(73) Assignee: Faurecia Autositze GmbH (DE)

( * ) Notice: Subject to any disclaimer, the term of this patent is extended or adjusted under 35 U.S.C. 154(b) by 470 days.

(21) Appl. No.: 12/529,760

(22) PCT Filed: Feb. 28, 2008

(86) PCT No.: PCT/DE2008/000354
§ 371 (c)(1),
(2), (4) Date: Oct. 30, 2009

(87) PCT Pub. No.: WO2008/106936
PCT Pub. Date: Sep. 12, 2008

(65) Prior Publication Data
US 2010/0133882 A1    Jun. 3, 2010

(30) Foreign Application Priority Data
Mar. 3, 2007    (DE) .................. 10 2007 010 373

(51) Int. Cl.
*B60N 2/20* (2006.01)
(52) U.S. Cl. ................. 297/463.1; 297/335; 297/378.13

(58) Field of Classification Search .......... 297/326–328, 297/335, 336, 463.1, 378.1, 378.13
See application file for complete search history.

(56) References Cited

U.S. PATENT DOCUMENTS

| | | | | |
|---|---|---|---|---|
| 5,263,763 A * | 11/1993 | Billette | ...................... | 296/65.17 |
| 5,452,938 A * | 9/1995 | Ernst | .............................. | 297/362 |
| 5,702,157 A * | 12/1997 | Hurite | ...................... | 297/411.38 |
| 5,733,010 A * | 3/1998 | Lewis et al. | .............. | 297/411.32 |
| 6,019,413 A * | 2/2000 | Scraver et al. | .................. | 296/66 |
| 6,578,922 B2 * | 6/2003 | Khedira et al. | ........... | 297/411.32 |
| 6,715,841 B2 * | 4/2004 | Christoffel et al. | ........ | 297/463.1 |
| 6,942,295 B1 * | 9/2005 | Lopez | .......................... | 297/300.1 |
| 7,419,343 B2 * | 9/2008 | Nagayama | ..................... | 411/179 |

FOREIGN PATENT DOCUMENTS

| | | |
|---|---|---|
| CH | 639 178 | 10/1983 |
| DE | 10133708 | 12/2002 |
| EP | 1857625 | 11/2007 |

* cited by examiner

*Primary Examiner* — Peter R. Brown
(74) *Attorney, Agent, or Firm* — Robert W. Becker; Becker & Stachniak, P.C.

(57) ABSTRACT

A support pin component for attachment to a reclining part of a vehicle seat and for insertion into a support receiver of a support frame, and a vehicle seat having a support pin component. The support pin component comprises an attachment region configured for attachment to a reclining part of a vehicle seat, and a pin, preferably having an internal thread, configured for pivotable insertion into a support receiver of a seat frame. The support pin component is a shaped part of sheet steel.

1 Claim, 2 Drawing Sheets

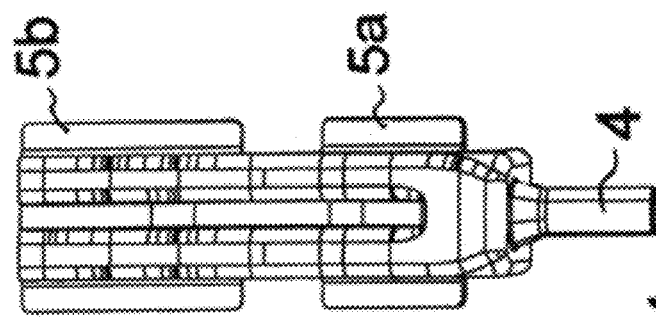
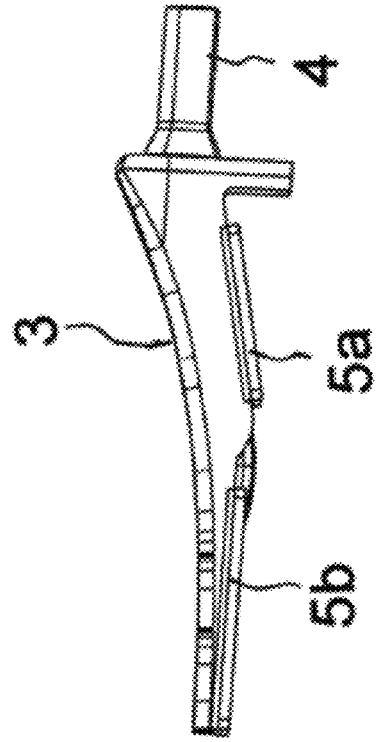
Fig. 2
Fig. 3
Fig. 4

SUPPORT PIN COMPONENT AND VEHICLE SEAT HAVING A SUPPORT PIN COMPONENT

BACKGROUND OF THE INVENTION

The instant application should be granted the priority dates of Mar. 3, 2007, the filing date of the corresponding German patent application 10 2007 010 373.7, as well as Feb. 28, 2008, the filing date of the International patent application PCT/DE2008/000354.

The present relates to a support pin component for attachment to the reclining part of a vehicle seat and for insertion into a support receiver of a seat frame, and a vehicle seat having a support pin component.

With vehicle seats having pivotable and/or foldable backrests, the reclining axis is generally formed by a bolt that is formed on the reclining part and that is inserted into a support receiver or a support eye of the seat frame. This support attachment must be adequately stable in order to be able to absorb the forces that occur during normal travel, and suplementarily the high forces that occur during a possible crash.

For this purpose, generally a cold pressed and subsequently hot forged component is used that has an elongated attachment region and a bolt or pin, whereby the elongated attachment region is welded onto the reclining part or its structure, and the pin extends outwardly from the attachment region and has an internal thread into which is threaded a screw. This projecting pin with inserted screw thus serves as a support pin for defining the pivot axis.

Such cold pressed and forged components of steel are adequately rigid in order to absorb the required forces and movements. However, they are very expensive to produce and are furthermore relatively heavy.

DE 101 33 708 C1 shows a mounting system for a divided motor vehicle back seat rest where two reclining parts and a central part disposed between them are connected by a support pin that has an adequately long pin shaft, whereby two spaced-apart recesses are formed on its free end.

CH 639 178 A shows a self-securing support pin for the securement against axial displacement during the installation into machine components, and is produced from a bent sheet strip. A hollow, tubular pin is formed in this fashion into which elongated slots can be formed.

The object of the present invention is to provide a support pin component, and a vehicle seat having such a support pin component, that enable a reliable support connection while having a low overall weight and manufacturing costs that are not too high.

SUMMARY OF THE INVENTION

This object is realized by a support pin component that comprises an attachment region configured for attachment to a reclining part of a vehicle seat, and a pin configured for pivotable insertion into a support receiver of a seat frame, wherein the support pin component is a shaped part of sheet steel. The object is also realized by a vehicle seat that comprises a seat frame, a reclining part received on the seat frame so as to be pivotable in a reclining axis, and a support pin component having an attachment region configured for attachment to a reclining part of the vehicle seat, and also having a pin configured for pivotable insertion into a support receiver of a seat frame, wherein the support pin component is a shaped part of sheet steel.

Thus, pursuant to the present invention the support pin component is not produced as a cold pressed and forged component, but rather as a shaped or deformed part of sheet metal. In this way, it can be lighter and have a lower manufacturing cost.

The support pin component is advantageously produced as a monolithic or one-piece shaped sheet metal component, whereby not only the pin but also the attachment region can be produced by a shaping or deformation process with a plurality of successive process steps. By means of such a cold shaping or deformation, the strength of the sheet steel is increased, so that at the conclusion it has a high strength for receiving the forces and moments that act on it.

For the production, a starting sheet can be unwound directly from the coil of an adequately deformable, ductile, economical steel, and can be shaped or deformed in a plurality of process steps. For this purpose, preferably also the pin is monolithically formed from the steel material without a weld seam, and correspondingly the rear attachment region is formed in the desired thickness. To form the pin as a tube or a tubular extension, a tube drawing technology can be utilized, according to which first a cup or bowl is drawn into the starting sheet in a plurality of successive process steps, and the thus-formed tube is subsequently deformed or swaged in a plurality of process steps. During this manufacture, a progressive composite process can be used according to which the starting sheet is pushed through a progressive composite tool in individual steps until the desired shapes or profilings are achieved in the successive shaping or deformation steps; in the last operation, the components are separated from the sheet strip.

The welding can, for example, be effected by $CO_2$ welding or also by laser welding. For the laser welding, one or more flanges are advantageously provided on the underside of the attachment region. For example, a forward flange can serve for the attachment to the outer support of the reclining part, and a rear flange can serve for the attachment to an inner sheet plate or a transverse support of the reclining part.

BRIEF DESCRIPTION OF THE DRAWINGS

The invention will be explained in detail in the following with the aid of one embodiment, which is shown in the accompanying drawings and in which:

FIG. 2: is a further perspective view of the support pin component;

FIG. 3 is a side view of the support pin component;

FIG. 4 is a top view of the support pin component.

DESCRIPTION OF PREFERRED EMBODIMENTS

Figure 1:
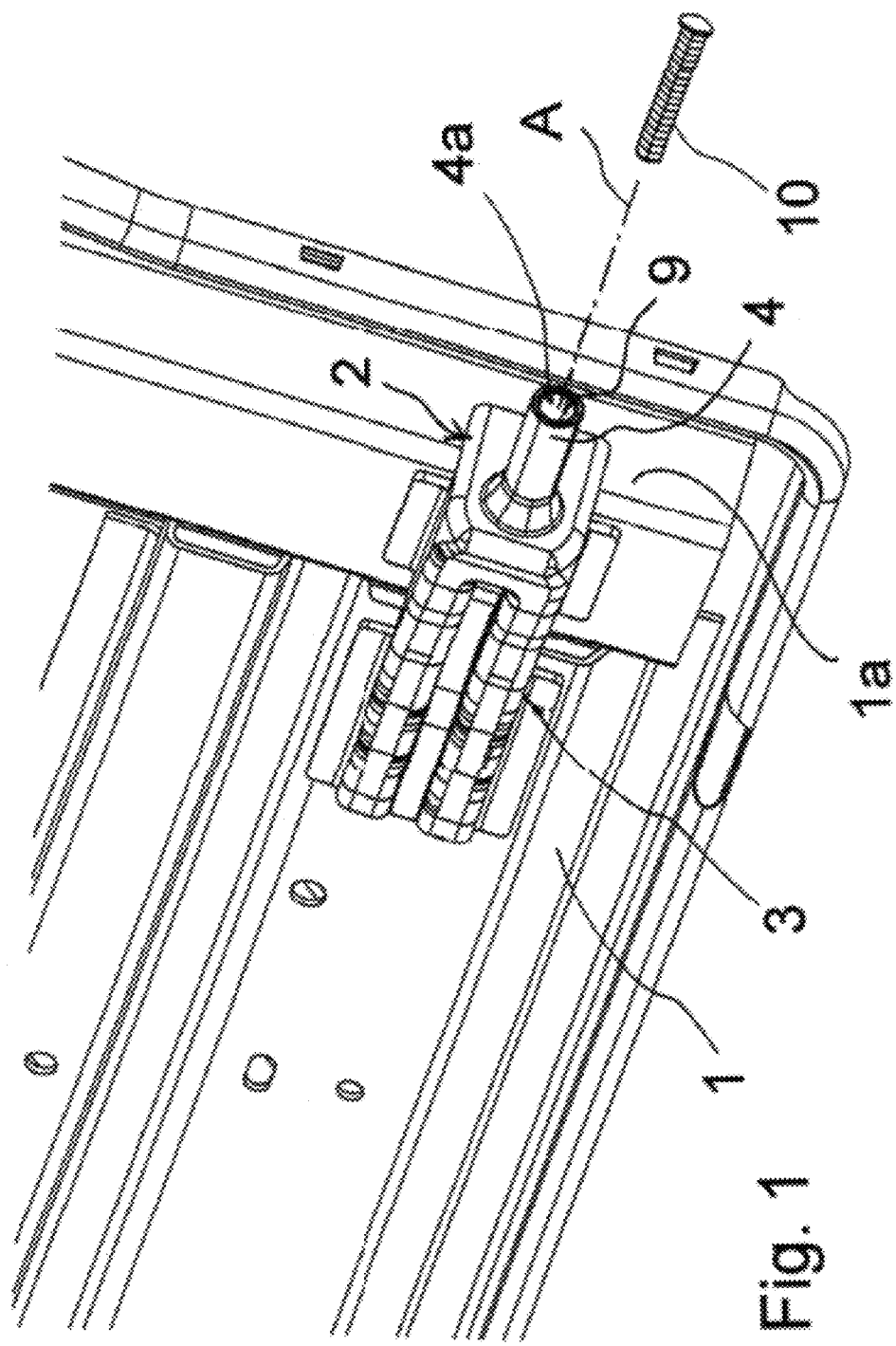
FIG. 1: is a perspective view of a reclining part having a support pin component attached thereto.

A reclining part 1 of a vehicle seat is pivotably mounted to a seat frame, which is not shown in the figures. The reclining part 1 can in particular be a backrest, or also e.g. a storage means or some other foldable functional reclining element, for example having a table function.

The reclining part 1 is mounted to the seat frame so as to be pivotable in a reclining axis A which is defined by a support or bearing pin or bolt component 2, and by a support or bearing receiver (support eye) that is formed on the seat frame, receives the support pin component 2, and is here not illustrated.

The support pin component 2 is provided with a rear attachment region 3 and a forward pin or bolt 4. The attachment region 3 serves for the attachment to the reclining part 1. The pin 4 extends in a lateral direction—along the axis A—and laterally outwardly for insertion into the support receiver of the seat frame.

Pursuant to the present invention, the support pin component 2 is embodied as a one-piece or monolithic sheet metal shaped part of steel. Supplementarily, laterally projecting flanges 5a, 5b can be secured to the underside of the attachment region 3 in order to enable a mounting attachment on the reclining part 1 by means of laser welding. In this connection, for example, a forward flange 5a can be provided for placement on a vertical support of the reclining part 1, and a rear flange 5b can be provided for placement on a central sheet or a transverse support of the reclining part 1. In principle, however, the support pin component 2 can also be configured without these flanges 5a, 5b, and can be attached to the reclining part 1 by, for example, $CO_2$ welding.

As can be seen, for example, in FIG. 3, the attachment region 3 advantageously increases continuously in height toward the pin 4. At its right, forward end the attachment region 3 is placed upon an edge 1a of the vertical support of the reclining part 1, where it is attached by means of a vertical weld. The pin 4, for example in its rear region, is initially somewhat conical, and its forward region has a tubular configuration. The pin has a hole or bore 4a with an internal thread 9 for receiving a screw 10 that, in a manner known per se, is inserted into the support receiver of the seat frame. The screw 10 is illustrated schematically.

The manufacture of the inventive support pin component 2 is effected by a multi-stage shaping or deformation process. In this connection, a progressive composite process is used according to which a starting sheet is unwound directly from a coil of economical ductile steel and is guided through a progressive composite tool. The pin shaft is first produced as a tube in that a cup or bowl having a greater diameter is drawn into the starting sheet and thus a tube having a greater diameter and greater length is formed. Subsequently, the length and diameter of a tube formed in this manner is reduced by deformation or swaging, accompanied by increase of its wall diameter for which purpose a die acts upon the tube in a plurality of process steps. After completion of the pin 4, the attachment region 3 is produced by one or more further process steps, whereby, for example, a single deep drawing process can be sufficient.

The internal thread 9 in the hole 4a of the tubular pin 4 can already be formed by roll formation in the shaping tool, or also subsequently by thread cutting.

The support pin components 2 formed in the sheet strip unwound from the coil are finally cut off from the tool in the last step. Subsequently, the flanges 5 can optionally be provided in the event that such flanges have not already been formed in the starting sheet.

The support pin component 2 is thus monolithically produced, and has no weld seams.

The starting sheet can have a thickness of e.g. 2.5 mm.

The specification incorporates by reference the disclosure of German 10 2007 010 373.7 filed Mar. 3, 2009 and International application PCT/DE2008/000354 filed Feb. 28, 2008.

The present invention is, of course, in no way restricted to the specific disclosure of the specification and drawings, but also encompasses any modifications within the scope of the appended claims.

The invention claimed is:

1. A vehicle seat comprising:
   a seat frame,
   a reclining part received on said seat frame so as to be pivotable in a reclining axis, and,
   a support pin component having an attachment region, wherein at least one laterally projecting flange is disposed on an underside of said attachment region and is attached to said reclining part of the vehicle seat, by means of a laser welding wherein said support pin component also has a pin configured for pivotable insertion into a support receiver of said seat frame, wherein said pin extends laterally outwardly from said attachment region and has a bore with an internal thread, further wherein a screw is inserted into said internal thread to serve as a support pin, and wherein said support pin component is a monolithic shaped part of sheet steel.

* * * * *